May 26, 1936.  C. S. KNIGHT  2,042,106
FILTER FAUCET
Filed May 12, 1934  2 Sheets-Sheet 1
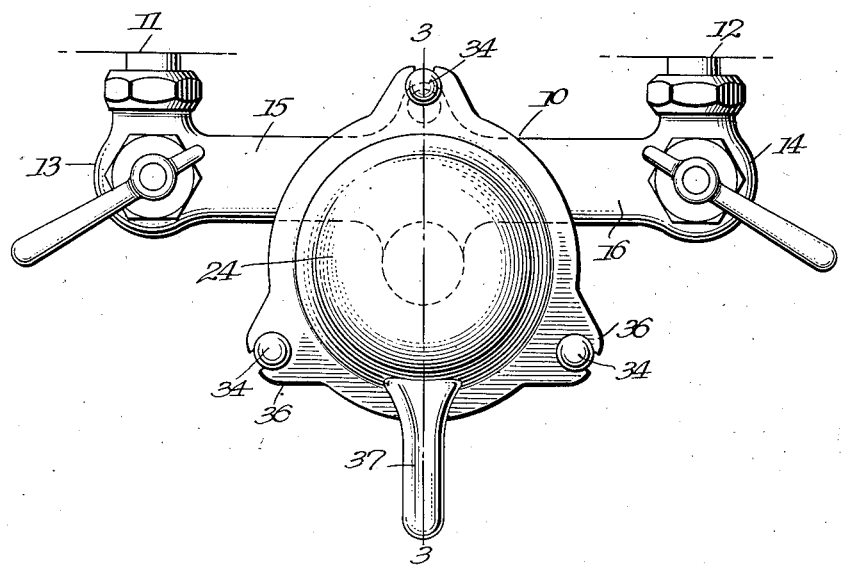
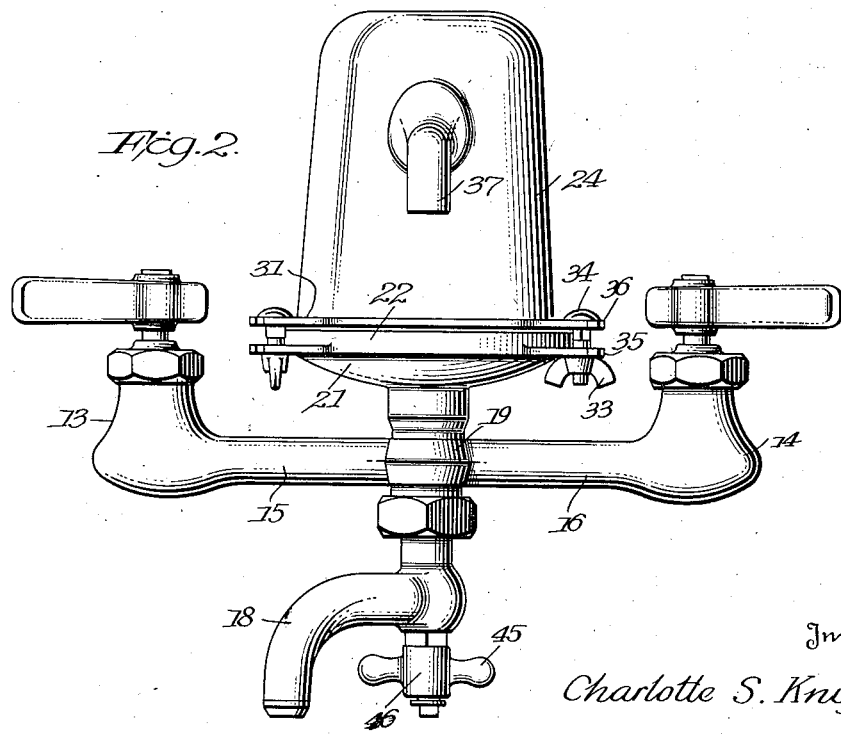
Inventor
Charlotte S. Knight May 26, 1936.   C. S. KNIGHT   2,042,106
FILTER FAUCET
Filed May 12, 1934   2 Sheets-Sheet 2
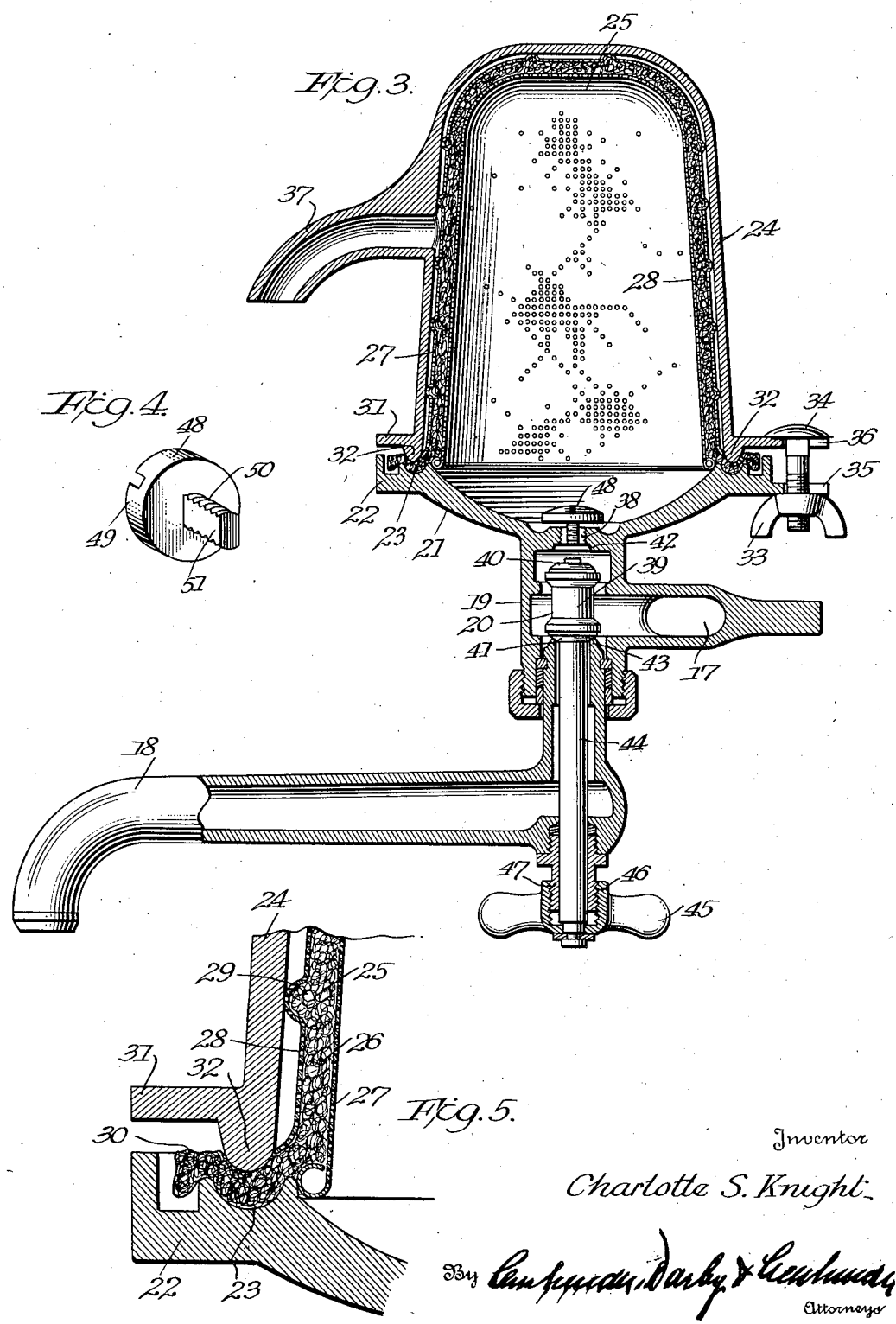
Inventor
Charlotte S. Knight Patented May 26, 1936

2,042,106

UNITED STATES PATENT OFFICE 2,042,106

FILTER FAUCET

Charlotte S. Knight, Freeport, N. Y.

Application May 12, 1934, Serial No. 725,357

12 Claims. (Cl. 210—77)

This invention relates to filter faucets and has for an object the provision of a filter which may be easily and quickly detached from the faucet to permit the renewal of the filtering medium without dismantling the faucet proper. With this construction, the highest sanitary conditions may be maintained at all times with the minimum of attention.

With the foregoing and other objects in view, the invention will now be more particularly described, reference being had to the accompanying drawings, in which:—

Figure 1 is a top plan view of the filter faucet;

Figure 2 is a front elevation thereof;

Figure 3 is a vertical section taken on the line 3—3 of Figure 1;

Figure 4 is an enlarged detail of the regulating member; and

Figure 5 is an enlarged fragmentary section illustrating the clamping means for the filter.

Referring to the drawings, the numeral 10 designates generally a filter faucet having hot and cold water inlets 11 and 12, respectively, which are controlled by valves 13 and 14. Extending inwardly from each of the valves are horizontal passages 15 and 16 which merge centrally of the fixture to form a mixing chamber 17. A common outlet 18 communicates with the mixing chamber 17 and interposed between the outlet and mixing chamber is a vertically extending diverter valve casing 19 housing a diverter valve 20, the function of which will be hereinafter described. At the top of the casing 19, and preferably integrally connected thereto, is a filter supporting plate 21. This plate is provided with an annular flange 22 having an annular groove 23 adjacent its inner edge.

A substantially dome shaped filter casing 24 is adapted to rest upon the support 21 and to house a filter 25 consisting preferably of three dome shaped sections. These sections comprise a central flexible filtering film or liner 26 and inner and outer relatively rigid foraminous supporting screens 27 and 28, respectively. The outer section 28 is provided with spaced bulged portions forming exteriorly disposed lugs 29 for spacing the filter from the inner wall of the filter casing. The inner and outer screens terminate at the open end of the filter casing but the filter film or liner 26 extends beyond the ends of the screens and forms an annular gasket 30 which is adapted to be clamped between the support and filter casing. For accomplishing this, the filter casing is provided with an annular flange 31 having an annular rib 32 which is complementary to the annular groove 23 of the supporting plate 21 and cooperates therewith to bodily flex and clamp the gasket portion 30 of the filter film between the support and filter casing. Any desirable clamping means may be utilized for this purpose and in the present instance there is illustrated a plurality of wing nuts and bolts 33 and 34, respectively, engaging notched portions 35 and 36 in the flanges 22 and 31.

With the construction thus far described, it will be evident that the present invention entirely eliminates the usual undesirable rubber gasket between the sections of a filter casing. In many instances it has been found that these gaskets are very unsatisfactory due to the fact that they permit bacteria to pass from the unfiltered to the filtered side of the casing. In the present invention, this objectionable feature is eliminated by utilizing the filter film which, when clamped between the flanges of the support and casing, constitutes a gasket which entirely prevents the escape of bacteria through the filter.

The filter casing is provided with an outlet spout 37 while the filter support 21 has a centrally located inlet 38 placing the interior of the filter casing in communication with the diverter valve casing 19. The diverter valve may be of any desired construction, and in the present instance constitutes a double cone head 39 having spaced valve portions 40 and 41 adapted to engage valve seats 42 and 43, respectively. The stem 44 of the diverter valve projects through a wall of the outlet 18 and has secured to its lower end an operating handle 45. This handle is formed with a central cup-shaped internally threaded portion 46 engaging an externally threaded sleeve 47 depending from the outlet 18 and constituting a guide for the stem 44.

In operation, and assuming that the diverter valve is in the position shown in Figure 3, the hot, cold, or mixed fluids will pass to the mixing chamber 17, into the valve casing 19, past the valve 40 and through the inlet 38 into the filter casing 24, where it will then pass through the filter and be discharged through the spout 37. If unfiltered water is desired, the handle 45 may be actuated to raise the stem 44, lifting the valve 41 off its seat and subsequently seating the valve 40, thereby closing the inlet to the filter but permitting the water to flow downwardly through the casing 19 where it will be discharged from the outlet 18.

In many localities where the water pressure is quite high, the force of the fluid passing through the inlet 38 would be too strong and cause inconvenience if some means were not provided to regulate the flow. Furthermore, the fluid would naturally impinge against the top of the filter with the result that the side walls would not be utilized to their fullest extent. Both of these objectionable features are overcome in the present construction by providing a regulating member 48 which functions both as a means for regulating the flow through the inlet 38 and for effecting an even distribution of the water against the walls of the filter. Referring particularly to Figures 3 and 4, the regulator consists of a substantially flat head 49 and a screw-threaded shank 50 which is adapted to be threaded into the inlet 38. The shank 50 is flattened upon opposite sides as at 51 to provide sufficient passage for the flow of water into the filter casing. By screwing the shank into the inlet 38, the head 49 may be positioned a predetermined distance from the inlet and the flow of water into the casing is accordingly regulated. The undersurface of the flat head 49 constitutes a baffle against which the water impinges as it passes through the inlet, and it directs the flow uniformly toward the side walls of the filter. Thus any variance in the water pressure of different communities is readily taken care of and satisfactorily controlled as it passes from the diverter casing into the filter casing, and by reason of the regulator being mounted interiorly of the filter casing, it is protected by the casing against tampering or accidental movement after it is once regulated to the desired position in the inlet passage. Furthermore, the large area of the filter is used to advantage by uniformly directing the fluid to the side walls of the filter and the undesirable feature of constantly utilizing only a small portion of the filter is eliminated.

It is, of course, necessary to renew the filter film or liner from time to time in order to obtain the best results, and this is easily and quickly taken care of in the present invention. It is merely necessary to unscrew the wing nuts and lift the filter casing 24 off of its support. Thereafter, the filter screens may be quickly detached and the used filter film removed. The new film may be easily slipped in place and the whole device quickly reassembled with the extended portion of the new filter film securely clamped between the flanges of the support and filter casing.

I claim:—

1. In a filter faucet, the combination of a faucet fixture having an inlet and an outlet, a valve controlling the inlet, a diverter valve casing interposed between the inlet and outlet, a filter support secured to said casing and having a filter feed passage communicating with said casing and constituting a valve seat, a filter casing having an outlet detachably mounted on said support, removable filtering means in said casing, and a reciprocating diverter valve controlling flow to the faucet outlet and the filter feed passage and engageable with said valve seat in one position of adjustment.

2. In a filter faucet, the combination of a faucet fixture having an inlet and an outlet, a valve controlling the inlet, a diverter valve casing interposed between the inlet and outlet, a filter support secured to and forming one wall of said diverter valve casing, said wall having a filter feed passage therethrough constituting a valve seat, a filter casing having an outlet detachably mounted on said support, removable filtering means in said casing, and a reciprocating diverter valve controlling flow to the faucet outlet and the filter feed passage and engageable with said valve seat in one position of adjustment.

3. In a filter faucet, the combination of a faucet fixture having an inlet and an outlet, a valve controlling the inlet, a diverter valve casing interposed between the inlet and outlet, a filter support comprising a plate integral with and forming the upper wall of said diverter valve casing, said wall having a filter feed passage therethrough constituting a valve seat centrally disposed with respect to said plate, a filter casing having an outlet detachably mounted on said support, removable filtering means in said casing, and a reciprocating diverter valve controlling flow to the faucet outlet and the filter feed passage and engageable with said valve seat in one position of adjustment.

4. In a filter, an open ended filter casing having a flange surrounding its open end, a rib projecting outwardly from said flange, a support for said casing having a port delivering to said casing and provided with a flange having a groove formed therein, a flexible filter medium supported within said casing and having an extended edge portion projecting outwardly between the rib and groove, said rib and groove being of greater width than the thickness of the filter medium whereby the latter is bodily flexed by said rib and groove to provide a seal, and means clamping the support and casing to effect the flexing of the filter medium.

5. In a filter, a substantially dome-shaped open ended filter casing having a flange surrounding its open end, a rib projecting outwardly from said flange, a support for said casing having a port delivering to said casing and provided with a flange having a groove formed therein, an open ended flexible filter liner fitted to said casing, relatively rigid inner and outer foraminous screens enclosing and supporting the flexible liner and terminating short of the groove and rib, and the flexible liner being extended outwardly between the rib and groove, said rib and groove being of greater width than the thickness of the filter medium whereby the latter is bodily flexed by said rib and groove to provide a seal, and means clamping the support and casing to effect the flexing of the filter liner.

6. In a filter, a filter casing having its lower edge rounded to form a rib and provided on its exterior with a flange located above the rib, a support for said casing having a port delivering to said casing and having a flange provided with a groove, the side walls of which project above the marginal portions of the support, said flange of the support being provided beyond the groove with a gutter, a flexible filter medium within the casing and having its edges extending outwardly between the rib and groove with the extreme outer edges of the medium projecting into the said gutter, said rib and groove being of greater width than the thickness of the filter medium whereby the latter is bodily flexed by said rib and groove to provide a seal and means clamping the support and casing to effect the flexing of the filter medium.

7. In a filter, a sectional filter casing, one section thereof provided with a rib and the other section having a groove formed therein, a flexible filter medium supported within said casing and having an extended edge portion projecting outwardly between the rib and groove, said groove being of greater width than the thickness of the filter medium and the rib being of sufficient thickness to bodily flex the filter medium when the sections are clamped together, and means for clamping the sections to effect the bodily flexing of the filter medium.

8. In a filter, an open ended filter casing, a support for said casing, one of said members being provided with a peripheral flange having a rib projecting therefrom, the other member having a peripheral groove formed therein, a flexible filter medium supported within said casing and having an extended edge portion projecting outwardly between the rib and groove, said groove being of greater width than the thickness of the filter medium and the rib being of sufficient thickness to bodily flex the filter medium when the casing and support are clamped together, and means for clamping the support and casing to effect the bodily flexing of the filter medium.

9. In a filter, a sectional filter casing, one section thereof provided with a rib and having a flange located back of the rib, the other section being provided with a groove and a gutter in close proximity thereto, a flexible filter medium supported within said casing and having an extended edge portion projecting between the rib and groove with the extreme edges of the filter medium projecting into the gutter, said groove being of greater width than the thickness of the filter medium and the rib being of sufficient thickness to bodily flex the filter medium when the sections are clamped together, and means for clamping the sections to effect a bodily flexing of the filter medium.

10. A filtering device comprising an open ended casing, a removable filtering liner fitted to the walls of said casing, a foraminous screen positioned between the casing and filtering liner and provided with a plurality of exteriorly disposed lugs spacing the screen and liner from the casing walls, a casing support having a port delivering to said casing, and means for directing flow through the port outwardly toward the casing walls, whereby a large area of the filter liner is utilized in filtering the liquid passing through the port.

11. A filtering device comprising an open ended casing, a removable filtering liner fitted to the walls of said casing, inner and outer foraminous screens supporting the filter liner, said outer screen having a plurality of exteriorly disposed lugs spacing the same from the casing walls, a casing support having a port delivering to said casing, and means for directing flow through the port outwardly toward the casing walls, whereby a large area of the filter liner is utilized in filtering the liquid passing through the port.

12. In a filter, an open-ended filter casing having a rib projecting from its open end, a support for said casing having a groove formed therein, the side walls of which project above the surface of the support, a filter element comprising an inner open-ended foraminous screen having its edges centered within and engaging the inner surface of the inner wall of the groove, an outer open-ended foraminous screen having its edges engaging the inner face of the casing, and a flexible filter medium between said foraminous screens having its lower end projecting outwardly beyond the ends of said screens and between the rib and groove to form therewith a seal between the casing and support.

CHARLOTTE S. KNIGHT.